United States Patent [19]

Takahira

[11] Patent Number: 4,986,327
[45] Date of Patent: Jan. 22, 1991

[54] LOW PROFILE RADIAL TIRES FOR TRUCKS AND BUSES REINFORCED WITH STEEL CARCASS PLY CORDS

[75] Inventor: Koji Takahira, Nara, Japan

[73] Assignee: Toyo Tire & Rubber Co., Ltd., Osaka, Japan

[21] Appl. No.: 224,013

[22] Filed: Jul. 25, 1988

[30] Foreign Application Priority Data

Jul. 23, 1987 [JP] Japan ................................. 62-185223

[51] Int. Cl.⁵ .......................... B60C 9/00; B60C 9/02; D02G 3/36
[52] U.S. Cl. .................................... 152/556; 152/451; 152/548; 57/212; 57/902
[58] Field of Search ................ 152/451, 527, 548, 556, 152/454; 57/902, 212

[56] References Cited

U.S. PATENT DOCUMENTS

| | | | |
|---|---|---|---|
| 4,082,132 | 4/1978 | Arai et al. | 152/454 X |
| 4,328,850 | 5/1982 | Uemura | 152/454 X |
| 4,518,024 | 5/1985 | Matsunuma | 152/536 |
| 4,609,024 | 9/1986 | Yatsunami et al. | 152/527 |
| 4,627,229 | 12/1986 | Bourgois | 152/556 X |
| 4,690,191 | 9/1987 | Kawasaki | 152/527 |

*Primary Examiner*—Robert A. Dawson
*Assistant Examiner*—Gregory J. Wilbur
*Attorney, Agent, or Firm*—Wenderoth, Lind & Ponack

[57] ABSTRACT

Low profile radial tires for trucks and buses reinforced with steel cords which comprise two layers of a core and an outer layer, the number of core filaments being 3 to 4 and the number of outer filaments being equal to or less than the number 5 greater than the number of the core filaments, all filaments being substantially equal in diameter and both the core filaments and the outer filaments being twisted in the same direction with a different pitch, and the aspect ratio of the tire being at most 0.85.

3 Claims, 2 Drawing Sheets

LOW PROFILE RADIAL TIRES FOR TRUCKS AND BUSES REINFORCED WITH STEEL CARCASS PLY CORDS

BACKGROUND OF THE INVENTION

1. Field of the Invention

The present invention relates to low profile radial tires for trucks and buses wherein steel cords are used for carcass plies as reinforcing elements for tires and more particularly to an improvement in the construction of the steel cords.

2. Prior Art

Heretofore, there have been used the steel cords having the structure of 2+7 as shown in FIG. 3, 3+9 in FIG. 4 or 1×12 in FIG. 5.

Steel cords 3 of 2+7 in FIG. 3, however, having a core 6 composed of two filaments 4 twisted together as shown in the figures, the alignment of the filaments becomes vertical at one position in the lengthwise direction of the cords as shown in FIG. 3(B), while the alignment becomes lateral at another position as shown in FIG. 3(A). These alignments appear at every ¼ pitch. It results in that said cords are composed of different portions having a different flexural rigidity in the lengthwise direction of the cords. When said cords are applied to a tire, the portions in a lateral alignment having a lower flexural rigidity are subjected to a concentrated fatigue breakage. Furthermore, outer filaments 5 which form an outer layer 7 are apt to close to a center over a circumscribed circle of the core 6 as shown in the figures by a solid line compared with a dotted line which illustrates an expected position. Accordingly, the difference of the flexural rigidity between the vertical alignment portions and the lateral alignment portions becomes larger, so there is a serious problem in the fatigue resistance. In addition, all filaments of said cords being covered by rubber, residual air which is caught during tire formation is hardly passed away to the outside through the inside of the cords. Then a tire is manufactured with remaining air in the cords, so that the tire manufactured is subjected to an early failure due to the residual air.

Steel cords 3 of 3+9 as shown in FIG. 4 having a narrow space between adjacent outer filaments 5, the penetration of rubber into the cords is insufficient, so that the outer filaments 5 contact with each other and wear out. It results in the deterioration of fatigue resistance.

Steel cords 3 of 1×12 as shown in FIG. 5 are composed of 12 filaments having a same diameter which are twisted in the same direction with the same pitch, so the outer filaments 5 fit in surface depressions of a core strand 6 and thereby the penetration of rubber is hindered. Consequently, core filaments 4 are apt to be drawn out during a tire service.

As mentioned above, prior art steel cords have not been provided with balanced properties between the uniform flexural rigidity and the rubber penetration property.

On the other hands, it has been a recent trend to use low profile tires having a low aspect ratio, namely wider tires with a flatter profile. The low profile tires are apt to cause a great deflection at a shoulder portion when they are travelled with a reduced inner pressure, so that steel carcass cords deteriorate rapidly in fatigue resistance and there is a great probability or danger to cause a tire burst.

SUMMARY OF THE INVENTION

It is therefore an object of the present invention to provide a low profile radial tire reinforced with steel cords which have uniform flexural rigidity throughout the lengthwise direction of the cords and have a good rubber penetration property and further have a structure to eliminate the contact of outer filaments.

It is another object of the present invention to provide a low profile radial tire which does not cause a burst even when a tire is travelled with a reduced inner pressure.

In accordance with the present invention, a sectional construction, twisting direction and twisting pitch of a steel cord are specified as set forth hereinafter to solve the problems in the prior art low profile radial tires.

As mentioned above, excessive penetration of rubber into a cord causes the retention of air which is caught during tire formation. A tire produced with such steel cords causes an early separation failure. On the contrary, less penetration of rubber into a cord has filaments worn out due to the contact of filaments with each other, so the cord is likely fatigued and rusted. Therefore, it is important to construct a steel cord so that the penetration of rubber may be well controlled by preferable air permeability of steel cord whereby the retention of air is eliminated and an early separation failure is prevented.

In accordance with the above, a steel cord to be used for a low profile radial tire of the present invention is constructed as follows.

All filaments used in a cord are substantially equal in diameter. A core and an outer layer are twisted in the same direction but with a different pitch. The core is composed of 3 to 4 filaments and the outer layer is composed of a number of filaments which is equal to or less than the number which has another 5 in addition to the number of core filaments.

Twisting both the core and the outer layer in the same direction can make a cross angle of the filaments small between the core and the outer layer, so contact pressure between the core and outer filaments is eliminated and thereby fatigue resistance is improved.

Twisting with a different pitch prevents the insufficiency of rubber penetration due to a structural defect caused by twisting them in the same direction with a same pitch as shown in FIG. 5. It is preferable that the outer layer has a twisting pitch larger than that of the core. The most preferred ratio of the twisting pitch of the outer layer to that of the core is 2 to 1, but a modified ratio of the pitch in the range of 50% is also employable. Then the ratio of 3 to 2 may also be used.

Composing the core with 3 to 4 filaments retains proper air permeability. In case of two filaments, the difference of flexural rigidity occurs in the lengthwise direction and besides air is likely to remain due to the insufficiency of air permeability. In case of 5 filaments, a center space of the core becomes too large, as shown in FIG. 6, to be filled with rubber, so it shows excessive air permeability and easily rusts.

Composing the outer layer with the number of filaments which is equal to or less than the number having another 5 in addition to the number of the core filaments is based on the following reasons.

Generally, the number o: the outer filaments is preferred to be the number of the core filaments plus 6 in view of the cord strength. The cord structure of 3+9 as shown in FIG. 4 is proper in this sense. But, as mentioned before, the penetration of rubber is insufficient. Accordingly, the present invention employs the cord structure wherein the upper limit of the additional number is 5 in order to promote the rubber penetration.

Consequently the cord structure in accordance with the present invention is 3+1, 3+2, 3+3, 3+4, 3+5, 3+6, 3+7, 3+8, 4+1, 4+2, 4+3, 4+4, 4+5, 4+6, 4+7, 4+8 and 4+9.

By employing these construction, the rubber penetration into the steel cords is made just sufficient to eliminate the retention of residual air caused by the insufficiency of air permeability due to excessive rubber penetration as well as an early separation failure caused by said residual air. On the other hands, the defects caused by the insufficiency of rubber penetration such as fretting wear between filaments, fatigue and occurrence of rust due to excessive air permeability are eliminated. Contact pressure between the core filaments and the outer filaments is diminished by twisting in the same direction, so contact fatigue is also eliminated. Uniform flexural rigidity in the lengthwise direction of the cords eliminates the occurrence of a partial fatigue.

Accordingly a low profile radial tire produced with the steel cords in accordance with the present invention is free from &he residual air defects, fatigue and rust and consequently enjoy high durability and a longlife.

Further investigation reveals that the above core structure shows excellent effects when the aspect ratio of a tire i.e. tire section height divided by section width is at heighest 0.85. When the aspect ratio is heigher than 0.85, steel cords used are fatigued remarkably during tire running even with an original inner pressure, so that cord filaments are broken.

Furthermore, we have reviewed the relation between the aspect ratio and a filament diameter of the steel cords used for carcass plies and consequently we have employed steel cords wherein an outer diameter of a tire is 3500 to 5500 times larger than a diameter of cord filaments. In case said value exceeds 5500, rigidity of a tire becomes insufficient. As a result, steering stability deteriorates so that passengers on a bus are likely to get carsick. On the other hand, in case the value is less than 3500, steel cords are fatigued to the extent that tire burst is caused.

Accordingly, in the present invention, steel cords having a specific structure as defined above are used for carcass plies of a low profile radial tire having an aspect ratio at highest of 0.85 and besides a diameter of filaments is decided depending upon an outer diameter of tires, and thereby low profile radial tires for trucks and buses having excellent steering stability and residential amenity can be provided and then passengers on a bus hardly get carsick.

DESCRIPTION OF THE PREFERRED EMBODIMENT

Embodiment 1

Figure 1:
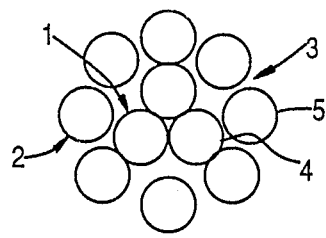
FIG. 1 is a cross-sectional view of one embodiment of the steel cords to be used for low profile radial tires for trucks and buses in accordance with the present invention.
Figure 2:
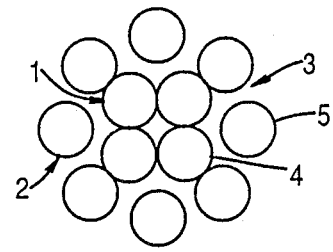
FIG. 2 is a cross-sectional view of another embodiment of the steel cords for low profile radial tires in accordance with the present invention.
Figure 3A:
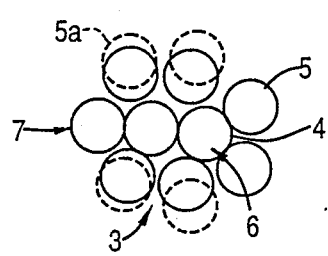
FIGS. 3A, 3B, 4 and 5 are cross-sectional views showing examples of prior art steel cords.
Figure 3B:
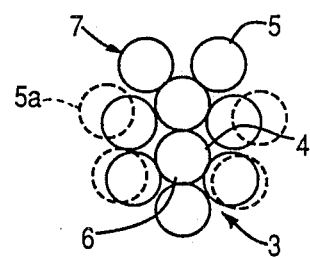
Figure 4:
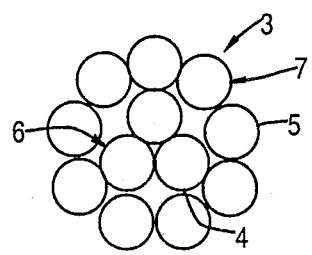
Figure 5:
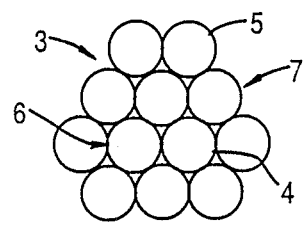
Figure 6:
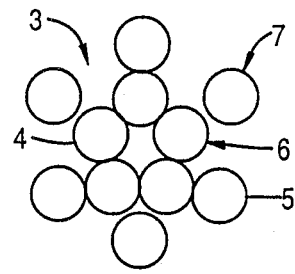
FIG. 6 is a cross-sectional view showing a comparative structure of a steel cord for comparison with the cord of the present invention.

Four types of steel cords are prepared. One is the steel cords in accordance with the present invention which have the cord structure shown in FIG. 1. Other three are prior art steel cords and comparative cords. Each structure is shown in Table 1. Cord mark A is a steel cord in accordance with the present invention which is composed of a core of three filaments and an outer layer 2 of eight filaments, that is, 3+8 structure as shown in FIG. 1. Cords marked B and C are prior art steel cords composed of a core 6 of three filaments and an outer layer 7 of nine filaments, i.e. 3+9 structure in FIG. 4 and a core 6 of two filaments and an outer layer 7 of seven filaments, i.e. 2+7 structure in FIG. 3. Core mark D is a comparative cored composed of a core 6 of five filaments and an outer layer 7 of six filaments, i.e. 5+6 structure as shown in FIG. 6.

TABLE 1

| cord mark | A | B | C | D |
|---|---|---|---|---|
| structure | 3 + 8 × 0.22 mm | 3 + 9 × 0.22 mm | 2 + 7 × 0.22 mm | 5 + 6 × 0.22 mm |
| direction of twist (core) | S | S | S | S |
| direction of twist (outer) | S | S | S | S |
| pitch of twist (mm) (core) | 6.0 | 6.0 | 6.0 | 7.0 |
| pitch of twist (mm) (outer) | 12.0 | 12.0 | 12.0 | 14.0 |
| strength (kg) | 125 | 137 | 100 | 124 |
| *rubber penetration (cc/min) | 12 | 55 | 0 | 1260 |
| *fatigue resistance | 100 | 129 | 76 | 156 |
| cord weight (g/m) | 3.32 | 3.62 | 2.72 | 3.32 |
| *cord strength | 296 | 297 | 289 | 294 |

TABLE 1-continued (kg/mm²)

*rubber penetration:
In the center portion of a rubber piece of 50 mm length a test cord is embedded. Compressed air of 2 kgf/cm² is introduced from one end and a flow amount of air is measured. Smaller value indicates that a larger amount of rubber penetrates into the cords.
*Fatigue resistance is indicated in the form of an index by setting the value of cord mark B to be 100.
*Cord strength is calculated using the formula, (strength) × 7.86 ÷ (cord weight), wherein 7.86 is iron density.

Then low profile radial tires of 11R 22.5, aspect ratio of 0.80 were prepared using the above steel cords for carcass plies. Comparative tests were conducted upon radial tires TA of the embodiment of the present invention and tires TB, TC, TD for comparison. Test results are shown in Table 2 wherein the value is indicated in the form of an index by setting the value of a comparison TB to be 100.

TABLE 2

|  | Embodiment | Comparison | | |
|---|---|---|---|---|
| tire mark | TA | TB | TC | TD |
| ply cord | A | B | C | D |
| end counts (number/5 cm) | 25.0 | 23.0 | 30.5 | 25.0 |
| *defects of residual air | 4 | 100 | 162 | 3 |
| *separation resistance | 261 | 100 | 72 | 68 |
| *retention of strength | 162 | 100 | 114 | 89 |
| outer diameter of tire (mm) | 1049 | 1050 | 1050 | 1049 |
| outer diameter of tire/filament diameter (mm) | 4768 | 4773 | 4773 | 4768 |

*Defects of residual air were tested for 1000 tires respectively.
*separation resistance:
Each tire was inflated with 7.5 kg/cm² pressure and a drum test was conducted at 100 km/h speed with a load of JIS 100%. Running period of times was indicated in the form of an index.
*retention of strength:
Each tire was mounted on a truck. After running of 100,000 km, each tire was detached from the truck and disassembled to take out ply cords. Then strength was measured and compared with the strength before running.

As apparent from Table 1 and Table 2, the steel cords of this embodiment(cord mark A) being preferable both in air permeability and rubber penetration, the radial tire of this embodiment(tire mark TA) causes less defects of residual air and also shows better results both in the separation resistance and in the retention of strength. Thus a highly durable tire is obtained by the present invention. On the contrary, comparison tires using the steel cords which are excessive or insufficient in the air permeability and the rubber penetration are inferior in durability.

Embodiment 2

Radial tires having variation in aspect ratio and size were prepared using the steel cords of 3+8×0.22 for carcass plies. Comparative tests were conducted upon tires alter running of 20,000 cycles in tire revolutions given by the following equation to elucidate the relation of tire aspect ratio and strength retention coefficient of steel cords. Strength retention coefficient is obtained by comparing the strength of detached steel cords after running with the strength before running.

$$\text{tire revolution} = \frac{\text{tire running distance (m)}}{\text{tire outer diameter (m)} \times 3.14}$$

Figure 7:
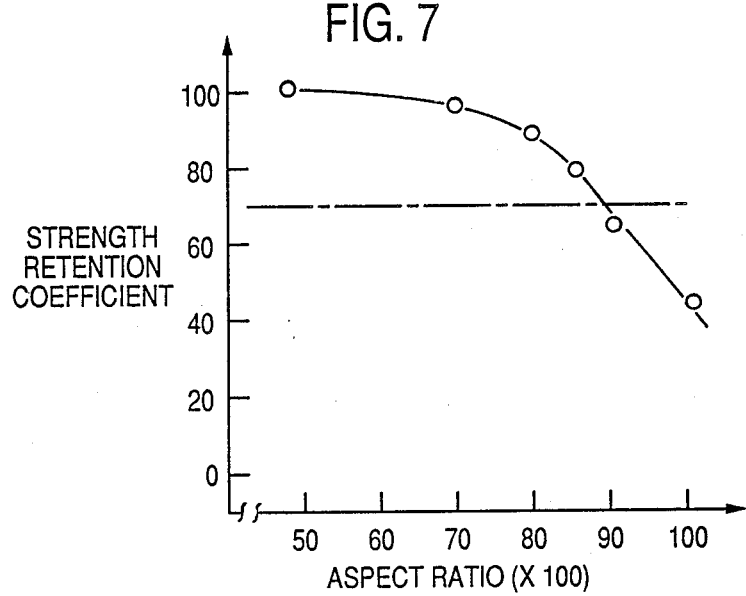
FIG. 7 is a relative representation of aspect ratios of tires and strength retention coefficient.

In FIG. 7, a chain line indicates a danger line drawn at 70% strength retention coefficient which means that a tire is likely to burst during running. It will be understood that fatigue resistance is improved when the aspect ratio does not exceed 0.85.

Embodiment 3

Steel cords of 3+8 structure were prepared using filaments of different diameter as shown in Table 3.

TABLE 3

| cord mark | a | b | c | d | e |
|---|---|---|---|---|---|
| structure | 3 + 8 × 0.15 mm | 3 + 8 × 0.22 mm | 3 + 8 × 0.32 mm | 3 + 8 × 0.19 mm | 3 + 8 × 0.26 mm |
| direction of twist (core) | S | S | S | S | S |
| direction of twist (outer) | S | S | S | S | S |
| pitch of twist (mm) (core) | 5.0 | 6.5 | 9.5 | 6.0 | 9.0 |
| pitch of twist (mm) (outer) | 10.0 | 13.0 | 19.0 | 12.0 | 18.0 |
| strength (kg) | 56 | 124 | 251 | 91 | 165 |
| rubber penetration (cc/min) | 6 | 10 | 2 | 7 | 5 |
| fatigue resistance | 520 | 100 | 3 | 380 | 95 |
| cord weight (g/m) | 1.50 | 3.33 | 7.05 | 2.41 | 4.58 |
| cord strength (kg/mm²) | 293 | 293 | 280 | 293 | 283 |

Low profile radial tires of 285/75R24.5 were prepared using the above steel cords for carcass plies. Comparative test results are shown in Table 4.

TABLE 4

| tire mark | Ta | Tb | Tc | Td | Te |
|---|---|---|---|---|---|
| ply cord | a | b | c | d | e |
| end counts (number/5 cm) | 30 | 15 | 8 | 20 | 11 |
| outer diameter of tire (mm) | 1052 | 1054 | 1052 | 1052 | 1052 |
| outer diameter of tire/filament diameter (mm) | 7013 | 4791 | 3288 | 5537 | 4046 |
| *steering stability | 60 | 100 | 95 | 75 | 95 |
| *carsick percentage | 95 | 0 | 2 | 80 | 0 |
| *running distance | 136 | 100 | 23 | 121 | 95 |

*Steering stability is indicated in the form of an index by setting the value of tire mark Tb to be 100.
*carsick percentage:
Tires were mounted on a bus with 40 persons. Said bus was driven on a tire test course of Toyo Tire & Rubber Co. Ltd. Then passengers' feeling was evaluated.
*running distance:
Each tire was inflated with 2.0 kg/cm² pressure and a drum test was conducted with a load of JIS 100%. Running distance (km) was indicated in the form of an index by setting the distance of tire mark Tb to be 100.

As apparent from Table 4, carsick percentage becomes high when the value of outer diameter of tire/- filament diameter is high. Tires Tb, Tc and Te show preferred results. But the tire Tc shows earlier failure when running with a low pressure as shown in the result of running distance due to insufficiency of the value of outer diameter of tire/filament diameter. Accordingly, said value is preferred to be in the range of 3500 to 5500.

EMBODIMENT 4

Steel cords were prepared as shown in Table 5 and low profile tires of 215/75R17.5 were prepared as shown in Table 6. Aspect ratio was 0.75.

TABLE 5

| cord mark | f | g | h | i | j |
|---|---|---|---|---|---|
| structure | 1 + 19 × 0.13 mm | 2 + 7 × 0.22 mm | 4 + 9 × 0.175 mm | 3 + 9 × 0.175 mm | 1 + 12 × 0.175 mm |
| direction of twist (core) | S | S | S | S | S |
| direction of twist (outer) | S | S | S | S | S |
| pitch of twist (mm) (core) | 10 | 6 | 6 | 5 | 10 |
| pitch of twist (mm) (outer) | 10 | 12 | 12 | 10 | 10 |
| strength (kg) | 68 | 90 | 96 | 89 | 89 |
| rubber penetration (cc/min) | 92 | 0 | 13 | 45 | 87 |
| fatigue resistance | 120 | 56 | 157 | 100 | 72 |
| cord weight (g/m) | 1.70 | 2.72 | 2.41 | 2.22 | 2.23 |
| cord strength (kg/mm$^2$) | 314 | 260 | 313 | 315 | 314 |

TABLE 6

| tire mark | Tf | Tg | Th | Ti | Tj |
|---|---|---|---|---|---|
| ply cord | f | g | h | i | j |
| end counts (number/5 cm) | 33 | 26 | 24 | 26 | 26 |
| defects of residual air | 3 | 151 | 2 | 100 | 1 |
| separation resistance | 68 | 91 | 225 | 100 | 70 |
| retention of strength | 85 | 121 | 159 | 100 | 78 |
| outer diameter of tire (mm) | 760 | 760 | 760 | 759 | 760 |
| outer diameter of tire/filament diameter (mm) | 5846 | 3454 | 4343 | 4337 | 4343 |
| carsick percentage | 96 | 2 | 0 | 0 | 0 |
| running distance | 121 | 30 | 119 | 100 | 31 |

Test conditions in Tables 5 and 6 are similar to those in Tables 1, 2 and 4. Index indication is made by setting the value of cord mark i and tire mark Ti to be 100.

As shown in Table 6, the tire Th in accordance with the present invention causes less defects of residual air and shows better results both in separation resistance and in the retention of strength. Further the occurrence of carsickness is nil. And besides running distance is superior even when running with a low inner pressure. Namely, the tire Th is well balanced in tire performances.

I claim:

1. A low profile radial tire for trucks and buses reinforced with steel carcass ply cords, said steel cords being composed of two layers of a core and an outer layer, the core comprising 3 to 4 filaments and the outer layer comprising the number of filaments equal to or less than the number 5 greater than the number of the core filaments, all of said core filaments and outer filaments being substantially equal in diameter, the core filaments and the outer filaments being twisted in the same direction with a different pitch, the aspect ratio of the tire being at most 0.85, and the steel cords having a cord strength of at least 285 kg/mm$^2$ that is calculated using the following formula:

Cord strength =

$$\frac{\text{tensile strength (kg)} \times 7.86 \text{ g/cm}^3 \text{ (iron density)}}{\text{Cord weight (g/m)}}.$$

2. A low profile radial tire for trucks and buses as claimed in claim 1, wherein an outer overall diameter of the tire is 3500 to 5500 times larger than a diameter of the cord filaments.

3. A low profile radial tire for trucks and buses as claimed in claim 1, wherein the steel cords have 3+8 structure.

* * * * *